US008215604B1

(12) United States Patent
Keicher

(10) Patent No.: US 8,215,604 B1
(45) Date of Patent: Jul. 10, 2012

(54) CONEX BOX ANTENNA MOUNT

(75) Inventor: Craig A. Keicher, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/924,029

(22) Filed: Sep. 14, 2010

(51) Int. Cl.
*A01K 97/10* (2006.01)
*H01Q 3/02* (2006.01)

(52) U.S. Cl. ......... 248/534; 248/511; 343/882; D14/238

(58) Field of Classification Search .................. 248/534, 248/536, 237, 511, 518, 519, 523; 343/882; D14/238
See application file for complete search history.

(56) References Cited

U.S. PATENT DOCUMENTS

| | | | | | |
|---|---|---|---|---|---|
| 1,643,689 | A * | 9/1927 | Woodin, Jr. | | 52/292 |
| 2,529,148 | A * | 11/1950 | Fratt | | 248/515 |
| 2,628,796 | A * | 2/1953 | Krizman | | 248/515 |
| 2,661,918 | A * | 12/1953 | Riggs | | 248/536 |
| 2,667,317 | A * | 1/1954 | Trebules | | 248/514 |
| 2,734,708 | A * | 2/1956 | Cohn | | 248/517 |
| 3,224,716 | A * | 12/1965 | Eville et al. | | 248/514 |
| 3,369,247 | A * | 2/1968 | Bacow | | 343/888 |
| 3,555,551 | A * | 1/1971 | Gronlund | | 343/715 |
| 5,600,334 | A | 2/1997 | Whitehouse | | 343/715 |
| 6,007,075 | A * | 12/1999 | Shum | | 280/11.12 |
| 6,618,014 | B2 | 9/2003 | Stoiljkovic et al. | | 343/702 |
| 6,685,383 | B2 | 2/2004 | Rosenfeld | | 403/350 |
| 6,760,570 | B1 | 7/2004 | Higdon et al. | | 455/90.3 |
| 6,788,925 | B2 | 9/2004 | Domes | | 455/351 |
| 7,085,139 | B2 | 8/2006 | Chen | | 361/760 |
| 7,268,743 | B2 * | 9/2007 | Lin | | 343/880 |
| 7,408,526 | B2 * | 8/2008 | Pan | | 343/880 |
| 7,443,361 | B2 * | 10/2008 | Haynes et al. | | 343/878 |
| D593,079 | S * | 5/2009 | Schmitz et al. | | D14/238 |
| D626,118 | S * | 10/2010 | Schmitz | | D14/238 |
| 8,052,107 | B2 * | 11/2011 | Yang et al. | | 248/201 |
| 2005/0229408 | A1 * | 10/2005 | Ngan et al. | | 30/376 |

* cited by examiner

*Primary Examiner* — Anita M King
(74) *Attorney, Agent, or Firm* — Gerhard W. Thielman, Esq

(57) ABSTRACT

An antenna mount is provided for securing an antenna at a conex enclosure. The mount includes a box bracket having a plurality of flanges, a base plate disposable beneath the box bracket, and a tensioner plate disposable beneath the base plate. The box bracket has a top surface with an orifice to receive the antenna. The base plate is securable to the flanges by a first plurality of fasteners. The tensioner plate is securable to the base plate by a second plurality of fasteners. The box bracket forms a sheet metal plate folded to form a box with fore, aft, lateral and top sides.

10 Claims, 4 Drawing Sheets

CONEX BOX ANTENNA MOUNT

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to mounting structures for a conex enclosure. In particular, the invention relates to a mounting device for a radio antenna with a modular conex box.

A conex enclosure is defined as a water-tight metal storage container that protects military equipment from the elements. The United States Armed Forces use a standard military radio antenna for electromagnetic communication. There are no known commercial off-the-shelf (COTS) mounting devices that achieve secure mounting of a standard military radio antenna in this manner to a standard conex enclosure for communications use.

SUMMARY

Conventional antenna mounts yield disadvantages addressed by various exemplary embodiments of the present invention. In particular, various exemplary embodiments provide an antenna mount for securing an antenna at a conex enclosure. The mount includes a box bracket having a plurality of flanges, said box bracket having a top surface with an orifice to receive the antenna; a base plate disposable beneath said box bracket, said base plate being securable to said flanges by a first plurality of fasteners; and a tensioner plate disposable beneath said base plate, said tensioner plate being securable to said base plate by a second plurality of fasteners. The box bracket forms a sheet metal plate folded to form a box with a fore, aft, lateral and top sides.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
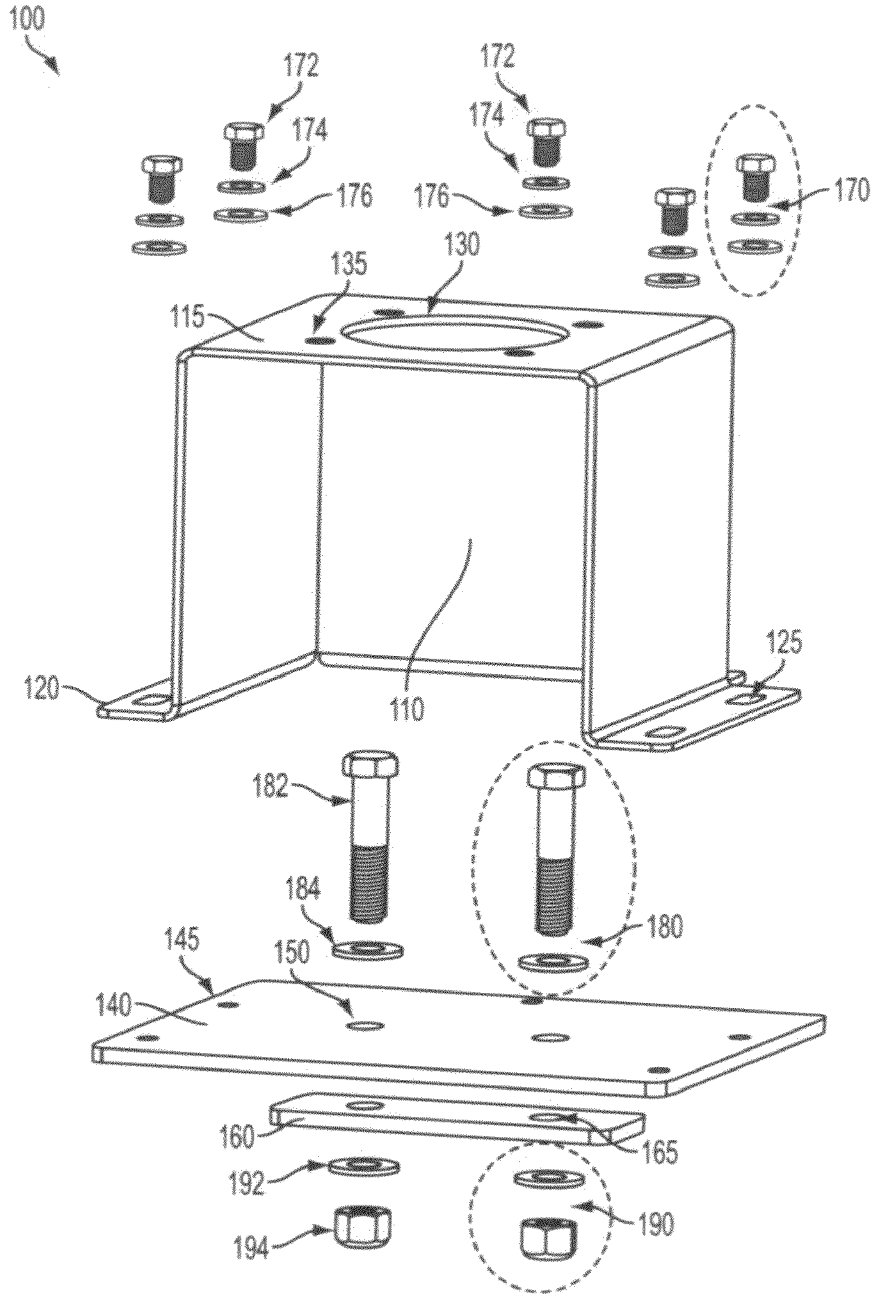
FIG. 1 is an isometric exploded view of a Conex box.

The Conex Box Antenna Mount (CBAM) is a mounting bracket designed to effectively attach standard military radio antennas to a standard conex enclose for communications use. FIG. 1 shows an isometric exploded view 100 of CBAM components. A standard antenna mount bracket 110, with one face exposed as a window, represents a sheet-metal cover folded to produce an enclosure with a top horizontal surface 115. The sheet metal can be steel or aluminum. Upon installation, the exposed window faces a conex enclosure corner. At opposite ends, the bracket 110 includes horizontal flanges 120 with flange holes 125. The top surface 115 includes a center through-hole 130 surrounded by four mount holes 135.

A base plate 140 with peripheral holes 145 and in-line holes 150 is disposed below the bracket 110. A tensioner plate 160 with counterpart holes 165 aligned with the in-line holes 150 is disposed below the plate 140. The plates 140, 160 can be composed of steel. Five sets of ⅜" fasteners 170 are disposed through the flange holes 125 to the peripheral holes 145 to attach the bracket 110 to the base plate 140. Each set of fasteners 170 includes a ⅜-16×½-inch hex bolt 172, a ⅜ lock washer 174, and a ⅜ flat washer (or shim) 176.

Two sets of ½" fasteners 180 are disposed through the in-line holes 150 and the counterpart holes 165 from above the base plate 140. Each set of fasteners 180 includes a ½-13×2½-inch hex bolt 182 and a ½ flat washer 184. Two corresponding sets of ½" ends 190 below the tensioner plate 160 secure the base and tensioner plates 140, 160 together. Each set of ends 190 includes a ½ flat washer 192 and a ½-13 nylon lock nut 194.

Figure 2:
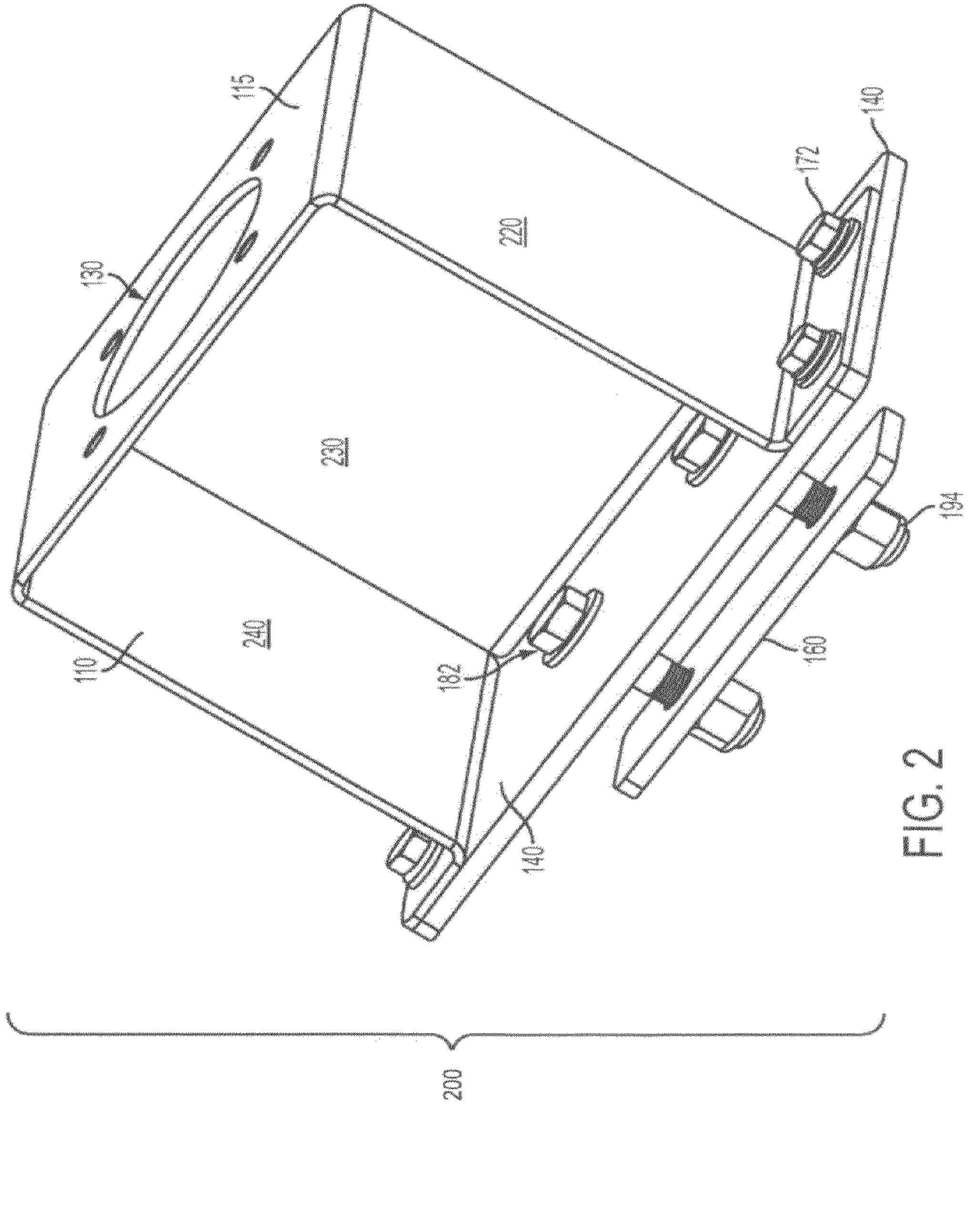
FIG. 2 is an isometric assembly view of the Conex box.

FIG. 2 shows an isometric view of the CBAM assembly 200, exhibiting the exposed face of the bracket 110 for clarity. Within the interior space of the bracket 110, the pair of ½ hex bolts 182 and their ½ nuts 194 secures the base plate 140 to the tensioner plate 160. Exterior of the bracket 110, the ⅜ fasteners 170 secure the flange 120 to the base plate 140. The sheet metal folds into the bracket 110 to include the top surface 115 that connects to a proximal (or front) side 220, a lateral side 230 and a distal (or rear) side 240, along with their associated flanges 120.

Figure 3:
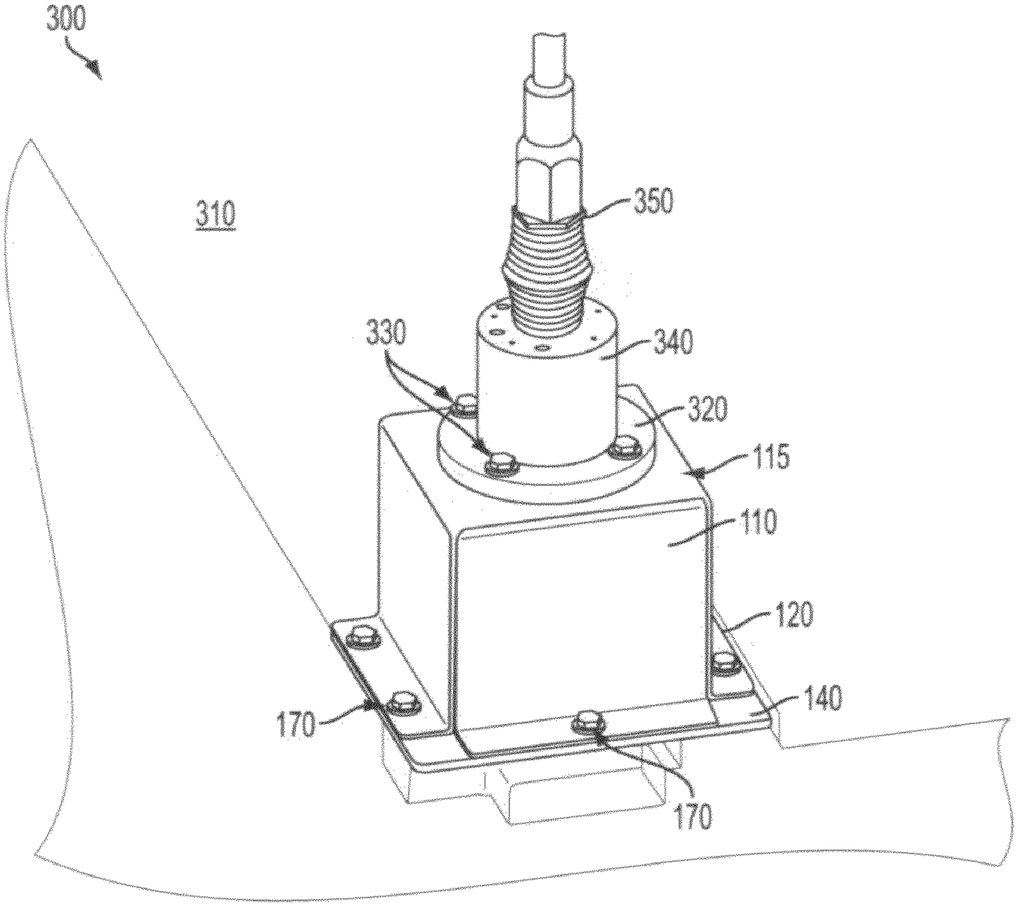
FIG. 3 is an isometric assembly view of the Conex box as installed.

FIG. 3 shows an isometric view for stand-alone assemblage 300 of the CBAM assembly 210 as installed on a mounting platform 310. The bracket 110 is shown secured by its flange 120 by the ⅜ fasteners 170 to the base plate 140 disposed on the platform 310. A circular antenna mounting base 320 is disposed on the top surface 115 secured by ¼ fasteners 330 and comprising hex bolts with accompanying washers and nuts. An antenna housing bracket 340 attaches to the mount 320 into which a standard military antenna 350 passes through the orifice 130 of the bracket 110.

Figure 4:
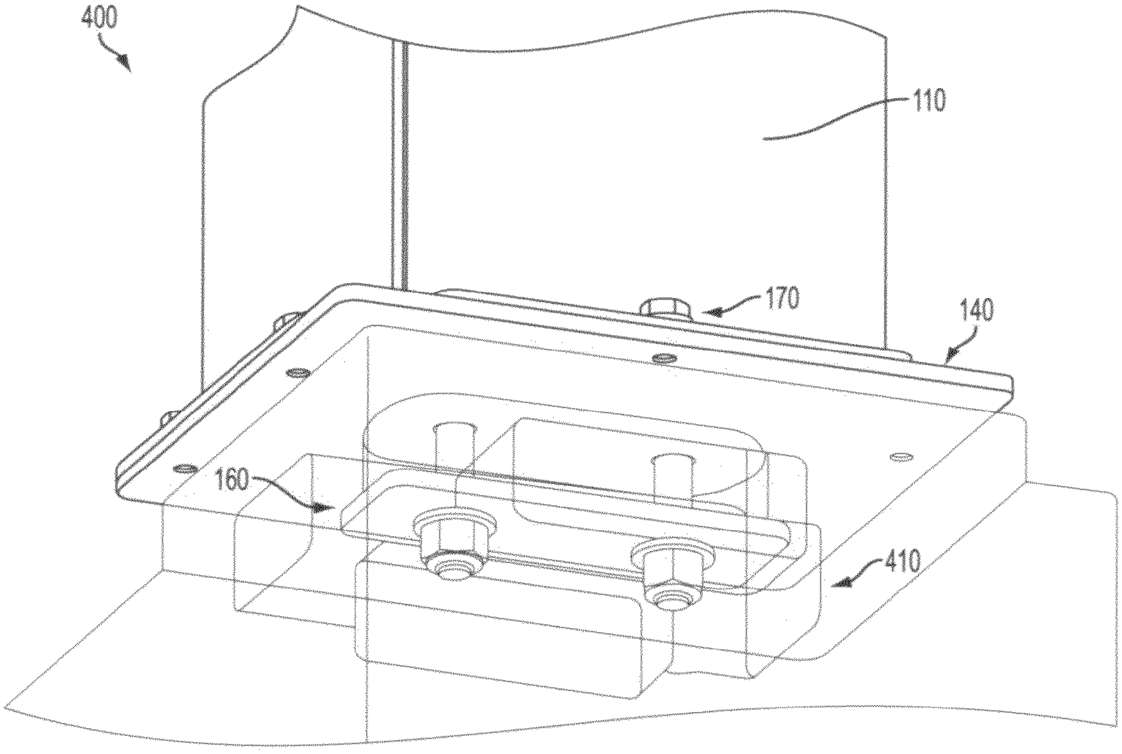
FIG. 4 is an isometric underside view of the Conex box.

FIG. 4 shows an isometric detail see-through view for installation 400 of the CBAM assembly 210 from underneath the platform 310. The base plate 140 rests atop the platform 310 above an ISO container structure 410 against which the compression plate 160 pushes via the ½ fasteners 180, 190.

A standard military radio antenna 350 mounts to an antenna bracket 340 through the hole 130 in the top surface 115 utilizing the existing four-hole bolt pattern of the antenna mounting base 320 secured by fasteners 330. The antenna mount 340 is fixed at the base 320 to the CBAM 210 using a five-hole bolt pattern on its flange 220.

The CBAM 210 secures itself to one of any lift corners of a conex enclosure. The CBAM 210 operates by using two mount segments as plates 140, 160 attached with bolts that tighten in compression and pinch the material of the conex enclosure lift corner. This process enables easy and universal mounting of the CBAM 210 to any standard conex enclosure. The CBAM 210 can be repeatedly mounted and removed as often as the operator requires.

By this device, United States military personnel can universally and conveniently attach present military radio antennas to a standard military conex box for communications use in any desired environment where a conex enclosure is present.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An antenna mount for securing an antenna at a conex enclosure, said mount comprising:

- a box bracket having a plurality of flanges, said box bracket comprising a sheet metal plate folded to form a box with fore, aft, lateral and top sides, said top side having an orifice to receive the antenna;
- a base plate disposable beneath said box bracket, said base plate being securable to said flanges by a first plurality of fasteners; and
- a tensioner plate disposable beneath said base plate, said tensioner plate being securable to said base plate by a second plurality of fasteners.

2. The mount according to claim 1, wherein said top side includes four holes around said orifice for mounting the antenna by securing with corresponding four fasteners.

3. The mount according to claim 1, wherein each fastener of said first plurality of fasteners include a ⅜-16×½-inch hex bolt, a ⅜ lock washer, and a ⅜ flat washer.

4. The mount according to claim 1, wherein each fastener of said second plurality of fasteners include a ½-13×2½-inch hex bolt and first and second ½ flat washers, and a ½-13 nylon lock nut.

5. The mount according to claim 4, wherein the second plurality of fasteners includes two fasteners for two corresponding holes in both said plates.

6. An antenna mount for securing an antenna at a conex enclosure, said mount comprising:

- a box bracket having a plurality of flanges, said box bracket having a top side with an orifice to receive the antenna;
- a base plate disposable beneath said box bracket, said base plate being securable to said flanges by a first plurality of fasteners; and
- a tensioner plate disposable beneath said base plate, said tensioner plate being securable to said base plate by a second plurality of fasteners, wherein said first plurality of fasteners includes five fasteners for five corresponding holes in said flange and said base plate, and each fastener of said first plurality of fasteners includes a ⅜-16×½-inch hex bolt, a ⅜ lock washer, and a ⅜ flat washer.

7. The mount according to claim 6, wherein said top side includes four holes around said orifice for mounting the antenna by securing with corresponding four fasteners.

8. The mount according to claim 6, wherein each fastener of said first plurality of fasteners include a ⅜-16×½-inch hex bolt, a ⅜ lock washer, and a ⅜ flat washer.

9. The mount according to claim 6, wherein each fastener of said second plurality of fasteners include a ½-13×½-inch hex bolt and first and second ½ flat washers, and a ½-13 nylon lock nut.

10. The mount according to claim 9, wherein the second plurality of fasteners includes two fasteners for two corresponding holes in both said plates.

* * * * *